(12) United States Patent
Long et al.

(10) Patent No.: US 8,817,778 B2
(45) Date of Patent: Aug. 26, 2014

(54) SESSION PROCESSING METHOD, DEVICE, AND COMMUNICATION SYSTEM

(75) Inventors: Shuiping Long, Beijing (CN); Hui Jin, Beijing (CN); Xiaoyan Duan, Beijing (CN); Qiang Yi, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 177 days.

(21) Appl. No.: 13/396,307

(22) Filed: Feb. 14, 2012

(65) Prior Publication Data

US 2012/0263171 A1 Oct. 18, 2012

Related U.S. Application Data

(63) Continuation of application No. PCT/CN2010/075804, filed on Aug. 9, 2010.

(30) Foreign Application Priority Data

Aug. 14, 2009 (CN) .......................... 2009 1 0165656

(51) Int. Cl.
  *H04L 12/66* (2006.01)
  *H04L 29/06* (2006.01)
  *H04W 4/14* (2009.01)
  *H04W 80/10* (2009.01)

(52) U.S. Cl.
  CPC ........ *H04L 65/1063* (2013.01); *H04L 65/1006* (2013.01); *H04L 65/1083* (2013.01); *H04W 4/14* (2013.01); *H04W 80/10* (2013.01); *H04L 65/1069* (2013.01); *H04L 65/1016* (2013.01)
  USPC ............................ 370/352; 709/228; 709/230

(58) Field of Classification Search
  CPC ............ H04L 65/1006; H04L 65/1083; H04L 65/123
  USPC ........... 370/338, 352; 709/205, 227, 228, 230
  See application file for complete search history.

(56) References Cited

U.S. PATENT DOCUMENTS

2008/0117893 A1 5/2008 Witzel et al.
2008/0299958 A1* 12/2008 Buckley et al. ............... 455/417

(Continued)

FOREIGN PATENT DOCUMENTS

CN 101330546 A 12/2008
WO WO 2008/055913 A1 5/2008

OTHER PUBLICATIONS

"3rd Generation Partnership Project; Technical Specification Group Core Network and Terminals; IMS Centralized Services (ICS) Protocol via I1 Interface; (Release 9)", 3GPP TS 24.294 v0.3.0, Aug. 2009, 30 pages.

(Continued)

*Primary Examiner* — Hassan Phillips
*Assistant Examiner* — Ajay Cattungal (57) ABSTRACT

Embodiments of the present invention disclose a session processing method, device, and communication system. The session processing method includes: when a first User Equipment (UE) is to set up an IP Multimedia Subsystem (IMS) session with a second UE, triggering setup of an unstructured supplementary service data (USSD) transaction between a Circuit Switched (CS) network and the first UE; and sending, by using the USSD transaction, an I1 protocol message used to bear IMS session control signaling. With the technical solutions of the present invention, when a UE is to set up an IMS session, a USSD transaction is set up between the UE and the CS network; I1 protocol messages exchanged between the UE and the Service Centralization and Continuity (SCC) Application Server (AS) (SCC-AS) are sent reliably by using the USSD transaction, which facilitates reliable control over IMS services.

11 Claims, 4 Drawing Sheets

(56) References Cited

U.S. PATENT DOCUMENTS

| | | | |
|---|---|---|---|
| 2009/0086719 A1* | 4/2009 | Mutikainen et al. | 370/352 |
| 2009/0257418 A1* | 10/2009 | Allen et al. | 370/338 |
| 2010/0046501 A1* | 2/2010 | Witzel et al. | 370/352 |
| 2011/0040836 A1* | 2/2011 | Allen et al. | 709/205 |
| 2011/0173434 A1* | 7/2011 | Buckley et al. | 713/150 |

OTHER PUBLICATIONS

"3rd Generation Partnership Project; Technical Specification Group Services and Architecture; Study on Enhancements to ICS; Release 9", 3GPP TR 23.883 v0.4.0, May 2009, 18 pages.

"3rd Generation Partnership Project; Technical Specification Group Services and System Aspects; Feasibility Study on Voice Call Continuity Support for Emergency Calls (Release 9)", 3GPP TR 23.826 v9.0.0, Mar. 2009, 82 pages.

"3rd Generation Partnership Project; Technical Specification Group Services and System Asp; IP Multimedia Subsystem (IMS) Centralized Services; Stage 2 (Release 8)", 3GPP TS 23.292 v0.4.0, Apr. 2008, 68 pages.

Supplementary European Search Report dated May 15, 2012 in connection with European Patent Application No. EP 10 80 7962.

Written Opinion of the International Searching Authority dated Nov. 11, 2010 in connection with International Patent Application No. PCT/CN2010/075804.

Partial Translation of Office Action dated Mar. 8, 2012 in connection with Chinese Patent Application No. 200910165656.8.

3GPP TS 24.294 v9.2.0, "3rd Generation Partnership Project; Technical Specification Group Core Network and Terminals; IP Multimedia Subsystem (IMS) Centralized Services (ICS) protocol via I1 interface (Release 9)", Jun. 2010, 76 pages.

3GPP TS 24.294 v0.2.0, "3rd Generation Partnership Project; Technical Specification Group Core Network and Terminals; IMS Centralized Services (ICS) Protocol via I1 interface (Release 9)", Jun. 2009, 15 pages.

International Search Report dated Nov. 11, 2010 in connection with International Patent Application No. PCT/CN2010/075804.

Partial Translation of Office Action dated Jul. 4, 2011 in connection with Chinese Patent Application No. 200910165656.8.

Translation of Office Action dated Dec. 9, 2011 in connection with Chinese Patent Application No. 200910165656.8.

3 GPP TSG CT WG1 Meeting #58, Change Request, "Introduction of I1 Mobile Terminated session using Enhanced MSC for ICS", Research in Motion, Sophia Antipolis (France), Apr. 20-24, 2009, C1-092255, 10 pages.

3 GPP TSG CT WG1 Meeting #58, Change Request, "Introduction of I1 Mobile Originated session using Enhanced MSC for ICS", Research in Motion, Sophia Antipolis (France), Apr. 20-24, 2009, C1-092254, 9 pages.

* cited by examiner

SESSION PROCESSING METHOD, DEVICE, AND COMMUNICATION SYSTEM

CROSS-REFERENCE TO RELATED APPLICATIONS

This application is a continuation of international Application No. PCT/CN2010/075804, filed on Aug. 9, 2010, which claims priority to Chinese Patent Application No. 200910165656.8, filed on Aug. 14, 2009, both of which are hereby incorporated by reference in their entireties.

TECHNICAL FIELD

The present invention relates to the field of communications technologies, and in particular, to a session processing method, device, and communication system.

BACKGROUND

The IP Multimedia Subsystem (IMS) adopts a Packet Switched access mode, while a Circuit Switched (CS) network adopts a CS access mode. To integrate the IMS and the CS network effectively, IMS Centralized Services (ICS) are proposed. The ICS support the use of CS access to bear media (streams) to implement IMS services.

The Service Centralization and Continuity (SCC) Application Server (AS) (SCC-AS) is an IMS AS that is based on a home network and can support the ICS. The SCC-AS can provide a function of enabling the ICS and act as the agent of a User Equipment (UE) to control an IMS session in an IMS domain.

Currently, an ICS protocol (or known as an I1 protocol) is being formulated, which helps to implement the ICS on a standard and normalized basis. The I1 protocol is an application protocol on an I1 interface, and can support functions similar to the main functions of the Session Initiation Protocol (SIP) (for example, initiation and modification of an IMS session). The I1 interface is located between the UE and the SCC-AS and used to transmit IMS service control signaling.

Figure 1:
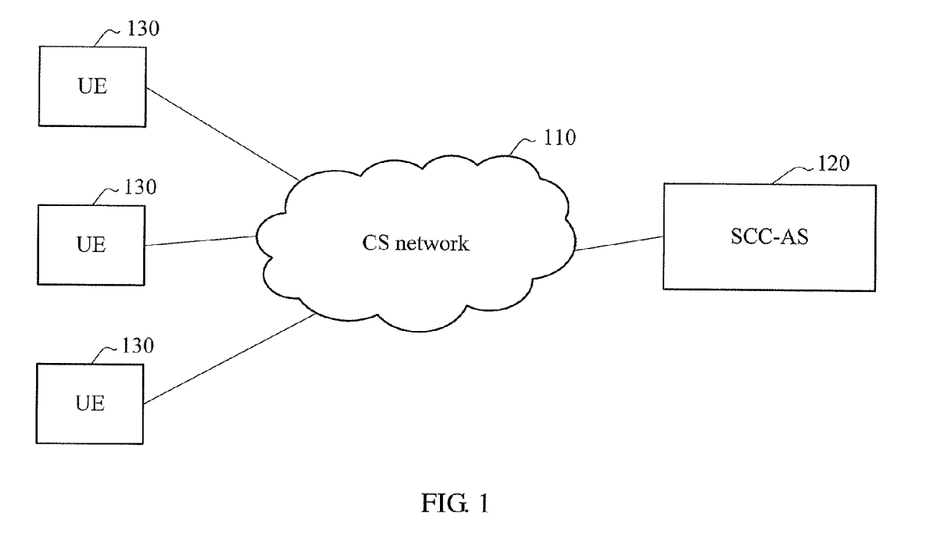
FIG. 1 is a schematic architecture diagram of a system based on the I1 protocol in the prior art.

The architecture of a system based on the I1 protocol is shown in FIG. 1. As shown in FIG. 1, the system includes a CS network 110, an SCC-AS 120, and a UE 130, where the UE 130 is interconnected with the SCC-AS 120 via the CS network 110.

Therefore, it is urgent to solve the problem how to reliably send I1 protocol messages exchanged between the SCC-AS and the UE to ensure effective control over IMS services that are based on CS access.

SUMMARY

Embodiments of the present invention provide a session processing method, device, and communication system, so that I1 protocol messages exchanged between a UE and an SCC-AS can be borne and sent effectively and reliably, therefore facilitating effective control over IMS services that are based on CS access.

To solve the preceding technical problem, embodiments of the present invention provide the following technical solutions:

A session processing method, including:
when a first UE is to set up an IMS session with a second UE, triggering setup of an unstructured supplementary service data (USSD) transaction between a CS network and the first UE; and sending, by using the USSD transaction, an I1 protocol message used to bear IMS session control signaling.

An AS, including:
a USSD transaction setup module, configured to trigger setup of a USSD transaction between a CS network and a first UE when a second UE initiates an IMS session to the first UE; and a sending module, configured to send, by using the USSD transaction, an I1 protocol message used to bear IMS session control signaling to the first UE.

A UE, including:
a USSD transaction setup module, configured to trigger setup of a USSD transaction between a CS network and a first UE when initiating an IMS session to a second UE; and a sending module, configured to send, by using the USSD transaction, an I1 protocol message used to bear IMS session control signaling to an SCC-AS.

A communication system, including:
an AS, configured to trigger setup of a USSD transaction between a CS network and a first UE when a second UE initiates an IMS session to the first UE, and send, by using the USSD transaction, an I1 protocol message used to bear IMS session control signaling to the first UE; and the CS network, configured to: when triggered by the AS, set up a USSD transaction with the first UE, and forward, by using the USSD transaction, the I1 protocol message sent by the AS and used to bear IMS session control signaling to the first UE, and/or receive an I1 protocol message sent by the first UE and used to bear IMS session control signaling.

As seen above, the technical solutions provided by embodiments of the present invention has the following merits: When a UE is to set up an IMS session, a USSD transaction is set up between the UE and the CS network; the I1 protocol messages exchanged between the UE and the SCC-AS can be borne and sent effectively and reliably by using the USSD transaction. Therefore, reliable control over IMS services that are based on CS access can be implemented.

BRIEF DESCRIPTION OF THE DRAWINGS

To make the technical solutions in the embodiments of the present invention or in the prior art clearer, the accompanying drawings for illustrating the embodiments of the present invention or the prior art are briefly described hereunder. Evidently, the accompanying drawings illustrate only some exemplary embodiments of the present invention, and persons skilled in the art can derive other drawings from such accompanying drawings without any creative effort.

DETAILED DESCRIPTION

Embodiments of the present invention provide a session processing method, device, and communication system to set up a USSD transaction between a UE and a CS network. In this way, an I1 protocol message exchanged between the UE and an SCC-AS can be sent effectively and reliably by using the USSD transaction, which facilitates effective control over IMS services that are based on CS access.

The technical solutions provided by the embodiments of the present invention are described clearly and completely with reference to the accompanying drawings. Apparently, the embodiments described below exemplary only, without covering all embodiments of the present invention. Persons skilled in the art can derive other embodiments from the embodiments provided herein without making any creative effort, and all such embodiments are covered in the protection scope of the present invention.

In the embodiments of the present invention, the SCC-AS may include a module that performs an ICS User Agent (IUA) function so as to provide IUA actions on behalf of ICS users and present standard IMS sessions in an IMS domain. The SCC-AS may further include a module that performs a CS Access Adaptation (CAA) function, where the module is configured to adapt the transmitting of IMS service control signaling, and transmit the service control signaling between the SCC-AS and the UE transparently through a CS domain.

In the embodiments of the present invention, both the UE and the SCC-AS can trigger the setup or release of a USSD transaction between the UE and the CS network, where the USSD transaction between the UE and the CS network is used to set up a point-to-point dialog or communication between the UE and the SCC-AS. In this way, the I1 protocol message can be transmitted between the UE and the SCC-AS by using the USSD, therefore implementing reliable control over IMS services. The USSD transaction is also a connection between a UE and the CS network, and may be referred to as a USSD connection or a USSD channel.

In the prior art, USSD is based on a Global System for Mobile Communication (GSM) network, and is a data service that can provide integrated and interactive information services. It is defined as a mechanism for transmitting information and instructions between a Mobile Station (MS) and network applications via a Mobile Switching Center (MSC), a Visitor Location Register (VLR), or a Home Location Register (HLR). In addition, the USSD can provide mobile communication users with a text-based interface that is used to provide or manage user services. In the embodiments of the present invention, the interactive mechanism of the USSD is used, so as to transmit an I1 protocol message between the UE and the SCC-AS.

The following describes the technical solutions of the present invention in detail with reference to specific embodiments.

Embodiment 1

Figure 2:
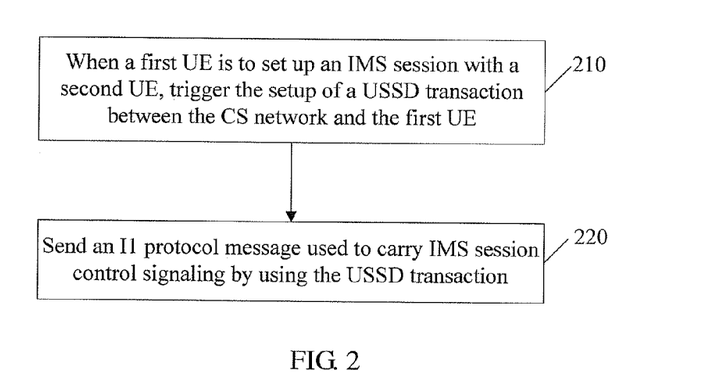
FIG. 2 is a flowchart of a session processing method according to a first embodiment of the present invention.

As shown in FIG. 2, a session processing method may include the following steps:

Step 210: When a first UE is to set up an IMS session with a second UE, trigger the setup of a USSD transaction between a CS network and the first UE.

The first UE is an ICS UE. The first UE or an SCC-AS triggers the setup of a USSD transaction between the CS network and the first UE.

In an application scenario, when the first UE is to send an I1 protocol message or other messages to the SCC-AS, if it is found that a USSD transaction is currently not set up between the CS network and the first UE, the first UE may trigger the setup of a USSD transaction between the CS network and the first UE, and transmit a protocol message at the same time as the setup of the USSD transaction.

Similarly, when the SCC-AS is to send an I1 protocol message to the first UE, if it is found that a USSD transaction is currently not set up between the CS network and the first UE, the SCC-AS, may also trigger the setup of a USSD transaction between the CS network and the first UE.

For example, when the first UE initiates an IMS session to the second UE, if it is found that a USSD transaction is currently not set up between the CS network and the first UE, the first UE may send a USSD Request message to the CS network to request setup of a USSD transaction between the CS network and the first UE, where the USSD Request message may carry an I1 protocol message used by the first UE to initiate an IMS session.

When the SCC-AS receives a SIP Invite message that the second UE uses to initiate an IMS session to the first UE, if it is found that a USSD transaction is currently not set up between the CS network and the first UE, the SCC-AS may also trigger the CS network to set up a USSD transaction between the CS network and the first UE so as to bear an I1 protocol message used to initiate an IMS session.

Step 220: Send, by using the USSD transaction, an I1 protocol message used to bear IMS session control signaling.

In an application scenario, the first UE and the SCC-AS may send each I1 protocol message by using the USSD transaction between the CS network and the first UE, and further implement I1 protocol interaction to achieve reliable control over IMS services.

In actual applications, either the USSD Request message used to set up a USSD transaction or the USSD Response message and USSD Request message exchanged that are after the USSD transaction is set up may be used to bear and send the I1 protocol message.

Further, the first UE and the SCC-AS may manage the USSD transaction on a flexible and real-time basis. For example, after the IMS session between the first UE and the second UE is set up or released, the release of the USSD transaction between the CS network and the first UE that is established may be triggered. When an I1 protocol message needs to be sent in an IMS session process, the setup of a USSD transaction between the CS network and the first UE may be triggered on a real-time basis so as to achieve the purpose of reducing network resource consumption.

It can be seen from the foregoing technical solution that, in the embodiment of the present invention, when the UE is to set up an IMS session, a USSD transaction is set up between the UE and the CS network; an I1 protocol message exchanged between the UE and the SCC-AS is sent reliably by using the USSD transaction, which facilitates reliable control over IMS services.

Embodiment 2

To help better understand the technical solutions provided by the embodiments of the present invention, the processes of managing and maintaining a USSD transaction and addressing a UE are described based on the following assumptions: UE A is an ICS UE, UE B is an IMS UE, and the UE A proactively initiates a call to the UE B to implement IMS services.

Figure 3:
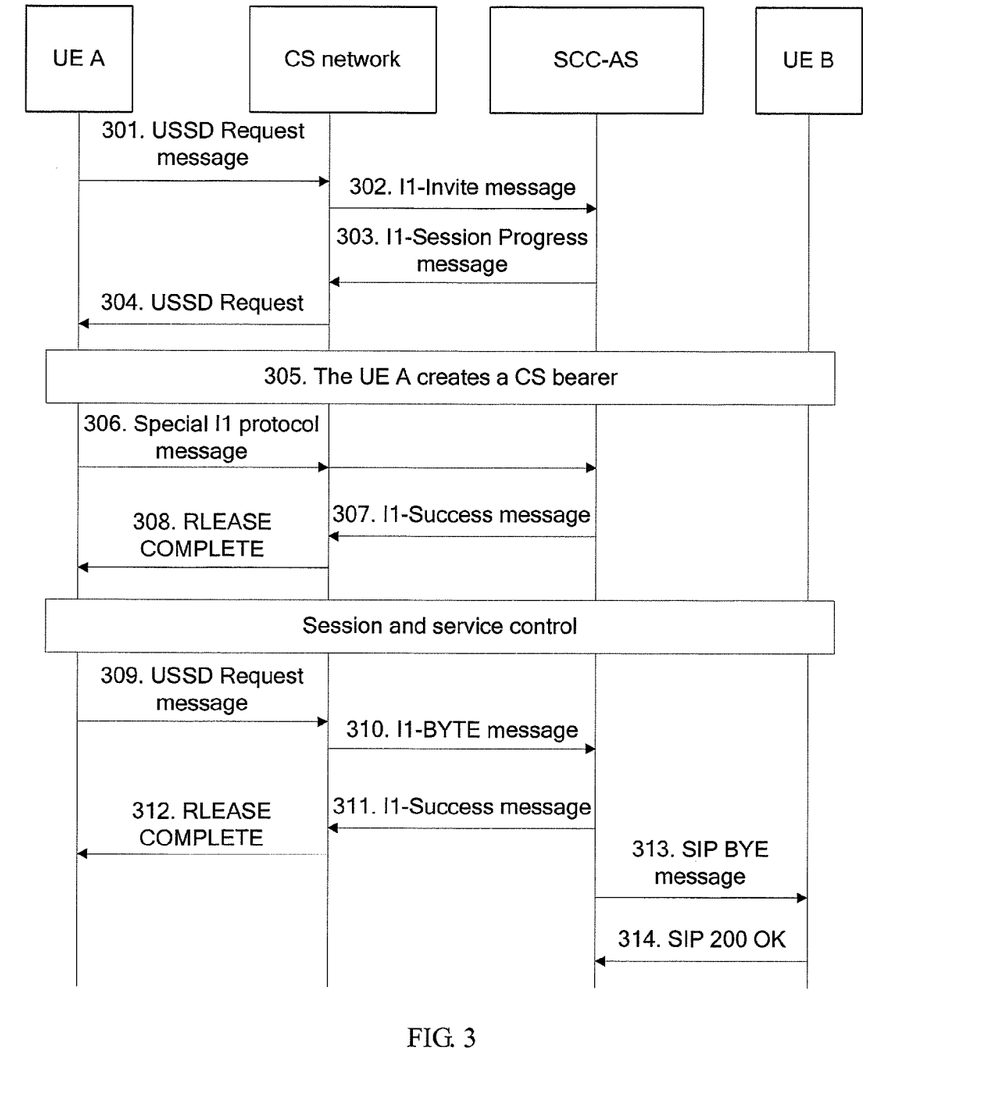
FIG. 3 is a flowchart of a session processing method according to Embodiment 2 of the present invention.

As shown in FIG. 3, a session processing method provided by Embodiment 2 of the present invention may include the following steps:

Step 301: The UE A triggers the setup of a USSD transaction.

In an application scenario, when the UE A is to initiate an IMS call to the UE B, the UE A may proactively initiate the setup of a USSD transaction between the UE A and a CS network.

Specifically, the UE A initiates a USSD Request operation to the CS network, that is, the UE A sends a USSD Request message to the CS network to trigger the setup of a USSD transaction, where the USSD Request message carries a service code, an ID of UE A (a CS domain ID), a transaction ID, an I1-Invite message, and so on.

The CS domain ID of the UE A may be an International Mobile Subscriber Identity (IMSI) or a Temporary Mobile Station Identity (TMSI) of the UE A, or other IDs used in the CS domain of the UE A. The I1-Invite message is used to indicate the setup of an IMS session between the UE A and the UE B, and the service code corresponds to an ICS application. Different service codes may be allocated to different applications borne by the USSD to distinguish and identify USSD applications.

For example, the value of a Home Public Land Mobile Network (HPLMN) service code (allocated to an HLR for processing) may be as follows:

service code=1X (Y); or service code=7 (Y);

In the above values, X ranges from 0 to 4, Y ranges from 0 to 9, and the brackets ( ) indicate that the service code is optional.

For example, the value of a Visited Public Land Mobile Network (VPLMN) service code (allocated to an MSC or a VLR for processing) may be as follows:

service code=1X (Y);

In the above values, X ranges from 5 to 9, and Y ranges from 0 to 9.

In this embodiment, the service code allocated to the ICS application is of an HPLMN type so as to support roaming scenarios. The CS network may address a USSD application according to the service code, and find a corresponding SCC-AS.

Step 302: The CS network sends the I1-Invite message and the CS domain ID of the UE A to the SCC-AS.

In an application scenario, the CS network may be triggered by the UE A to set up a USSD transaction between the CS network and the UE A, and record the transaction ID carried by the USSD Request message.

Further, the CS network addresses a USSD application according to the service code, sends the I1-Invite message and an ID of the UE A (the CS domain ID) to the SCC-AS according to an addressing result, and informs the SCC-AS of the fact that the USSD transaction between the CS network and the UE A is already set up. The ID of the UE A (the CS domain ID) that the CS network sends to the SCC AS may be converted by the CS network. For example, the CS network may convert the IMSI sent by the UE A into a Mobile Station International ISDN Number (MSISDN).

Step 303: The SCC-AS sends an I-Session Progress message to the CS network.

In an application scenario, after the SCC-AS receives an I1-Invite message and the ID of the UE A (the CS domain ID) that are sent by the CS network, the SCC-AS knows that a USSD transaction is set up between the UE A and the CS network.

The SCC-AS processes the received I1-Invite message, and sends an I1-Session Progress message that may carry a Public Service Identity Directory Number (PSI DN).

The I1-Invite message includes the ID of the UE A (an IMS domain ID) and a UE B ID (an IMS domain ID). The SCC-AS may authenticate the IMS domain ID of the UE A in the I1-Invite message according to the CS domain ID of the UE A. The IMS domain ID of the UE A and the UE B may be the URI or SIP URI of the UE A and the UE B.

Specifically, the SCC-AS finds one or multiple legal IMS domain IDs of the UE A according to the received CS domain ID of the UE A, and compares the found one or multiple legal IMS domain IDs of the UE A with the IMS domain ID of the UE A included in the I1-Invite message; if the found one or multiple legal IMS domain IDs of the UE A include the IMS domain ID of the UE A included in the I1-Invite message, the authentication succeeds, and the IMS session process may be continued; otherwise, the authentication fails, and the IMS session setup process may be terminated.

It is understandable that if the SCC-AS authenticates the IMS domain ID of the UE A included in the I1-Invite message by using the CS domain ID of the UE A, the effectiveness and reliability of the IMS service control may be improved. In actual applications, a module that implements the IUA function on the SCC AS may authenticate the IMS domain ID included in the I1-Invite message.

Step 304: The CS network sends a USSD Request message to the UE A.

In an application scenario, the CS network may initiate another USSD Request operation to the UE A by using the current USSD transaction, that is, the CS network sends a USSD Request message to the UE A, where the USSD Request message includes the foregoing I1-Session Progress message.

Step 305: The UE A creates a CS Bearer to bear IMS media streams.

In an application scenario, after receiving the I1-Session Progress message, the UE A obtains the PSI DN carried by the I1-Session Progress message. The UE A may trigger the setup of a CS bearer by using the PSI DN so as to bear the media streams of the IMS session between the UE A and the UE B.

Specifically, the UE A sends a call Setup message to the CS network, where the message carries the PSI DN; the CS network sends a SIP Invite message to the SCC-AS, where the message carries the PSI DN; the SCC-AS further sends a SIP Invite message to the UE B; the UE B sends a SIP 200 OK message to the SCC-AS; the SCC-AS forwards the SIP 200 OK message to the CS network; the CS network further sends a CONNECT message to the UE A; after the UE A receives the CONNECT message, it knows that the CS bearer setup succeeds. Subsequently, the CS bearer can be used to bear the media streams of the IMS session between the UE A and the UE B. According to the foregoing mode, it is evident that the UE A initiates a CS call by using the PSI DN as the called number to set up a CS bearer.

Step 306: The UE A transfers the turn of data transmission to the SCC-AS.

The transmission and reception of information in the USSD transaction need to be performed on an interactive basis (that is, the CS network or the UE can send a message to the peer end only after receiving a message sent by the peer end). Therefore, if the UE A has no actual I1 protocol message that needs to be sent within a set period of time, the UE A may transfer the turn of data transmission to the SCC-AS, so that the SCC-AS sends data to the UE A.

In actual applications, a timer may be set. If the UE A has no actual data that needs to be sent within a duration set by the timer, the UE A may transfer the turn of data transmission to the SCC-AS. The duration of transferring the turn of data transmission may be set according to an actual need, for example, it may be set to 0.5 second.

Specifically, the UE A sends a special I1 protocol message (for example, a defined I1-Dummy message) through a USSD Response message; the CS network forwards the special I1 protocol message to the SCC-AS. In this way, the turn of data transmission is transferred to the SCC-AS.

Certainly, the SCC-AS may also adopt the same way to transfer the turn of data transmission to the UE A.

By using the mechanism for transferring the turn of data transmission, a device that needs to send data can obtain the turn of data transmission immediately. In this way, a message can be transmitted between the UE A and the SCC-AS immediately and effectively, and the flexibility of service control is improved.

Step 307: The SCC-AS triggers the release of the USSD transaction.

In an application scenario, the SCC-AS may initiate the release of the USSD transaction at any time after the IMS session between the UE A and the UE B is set up.

Specifically, the SCC-AS sends, to the CS network, an instruction for releasing the USSD transaction and an I1-Success message, and so on, instructing the CS network to release the USSD transaction between the CS network and the UE A. The I1-Success message is used to inform the UE A of the fact that the IMS session is already set up.

It is understandable that the UE A may trigger the release of the USSD transaction at any time after the IMS session between the UE A and the UE B is set up.

Step 308: The CS network sends a RELEASE COMPLETE message to the UE A.

In an application scenario, the CS network may be triggered by the SCC-AS to release the USSD transaction that is previously set up between the CS network and the UE A after receiving the instruction for releasing the USSD transaction that is sent by the SCC-AS.

The CS network may further send a RLEASE COMPLETE message to the UE A, informing the UE A of the fact that the USSD transaction is released, where the RELEASE COMPLETE message may include an I1-Success message.

After receiving the RLEASE COMPLETE message, the UE A knows that the USSD transaction between the UE A and the CS network is released. So far, the process of setting up an IMS session between the UE A and the UE B by using the USSD transaction ends, and the USSD transaction is released.

It is understandable that releasing the USSD transaction between the CS network and the UE A immediately can minimize network resource consumption and increase resource utilization.

It should be noted that multiple an I1 protocol messages may be exchanged for multiple times during the setup of the IMS session. This embodiment is based on the assumption that three I1 protocol messages are exchanged.

After the IMS session is set up, the UE A and the UE B perform normal call services. If service control is required in the call process, the UE A or the SCC-AS may create a new USSD transaction to bear related I1 protocol messages.

Step 309: The UE A triggers the setup of a USSD transaction again.

In an application scenario, if the USSD transaction between the UE A and the CS network is already released, when the UE A decides to release a current IMS session (for example, the user of the UE A already hangs up), the UE A may initiate a USSD Request operation again to the CS network to trigger the setup of a USSD transaction between the UE A and the CS network again, so as to bear and send control signaling related to the release of the IMS session.

Specifically, the UE A sends a USSD Request message to the CS network to trigger the setup of a USSD transaction between the UE A and the CS network again, where the USSD Request message may carry an I1-BYE message (indicating that the IMS session is released), a service code, and so on.

Certainly, the UE B may also initiate the release of the IMS session. The way of initiating the release of the IMS session by the UE B is similar to the UE A, and is not further described.

Step 310: The CS network sends the I1-BYE message to the SCC-AS.

In an application scenario, the CS network may be triggered by the UE A to re-set up a USSD transaction between the CS network and the UE A.

Further, the CS network addresses a USSD application according to the service code, sends the I1-BYE message to the SCC-AS according to an addressing result, and informs the SCC-AS of the fact that the USSD transaction between the CS network and the UE A is already set up.

Step 311: The SCC-AS initiates the release of the USSD transaction again.

In an application scenario, the SCC-AS receives the I1-BYE message sent by the CS network, and knows that the USSD transaction between the UE A and the CS network is already set up.

The SCC-AS processes the I1-BYE message. It may initiate the release of the USSD transaction again, and send an I1-Success message (indicating to the UE A that the session is released successfully) and an instruction for releasing the USSD transaction to the CS network, and so on.

Step 312: The CS network sends a RLEASE COMPLETE message to the UE A.

In an application scenario, the CS network may release the USSD transaction between the CS network and the UE A after receiving the instruction for releasing the USSD transaction that is sent by the SCC-AS.

The CS network may further send a RLEASE COMPLETE message to the UE A, informing the UE A of the fact that the USSD transaction is released, where the RELEASE COMPLETE message may include an I1-Success message.

After receiving the RLEASE COMPLETE message, the UE A knows that the USSD transaction that is previously set up between the UE A and the CS network is released. So far, the process of releasing an IMS session between the UE A and the UE B by using the USSD transaction ends, and the USSD transaction is released.

Step 313: The SCC-AS sends a SIP BYE message to the UE B.

In an application scenario, the SCC-AS may further send a SIP BYE message to the UE B to instruct the UE B to release the IMS session.

It is understandable that step 313 may be executed before step 312 or that step 313 and step 312 may be executed at the same time.

Step 314: The UE B sends a SIP 200 OK message to the SCC-AS.

In an application scenario, after the UE B receives a SIP BYE message, the UE B releases the IMS session between the UE B and the UE A, and sends a SIP 200 OK message to the SCC-AS to indicate that the IMS session is already released.

It can be seen from the foregoing technical solution that, in this embodiment, when the UE A initiates an IMS call to the UE B, the UE A triggers the setup of a USSD transaction between the UE A and the CS network. An I1 protocol message exchanged between the UE and the SCC-AS can be borne and sent effectively and reliably by using the USSD transaction, which facilitates reliable control over IMS services.

Further, the UE A and the SCC-AS manage the USSD transaction flexibly, which improves the flexibility of the entire solution and is good for reducing network resource consumption.

Embodiment 3

To help better understand the technical solutions provided by the embodiments of the present invention, a detailed description is provided based on the following assumptions: UE A is an ICS UE, the UE B is an IMS UE, and UE B proactively initiates a call to the UE A to implement IMS services.

Figure 4:
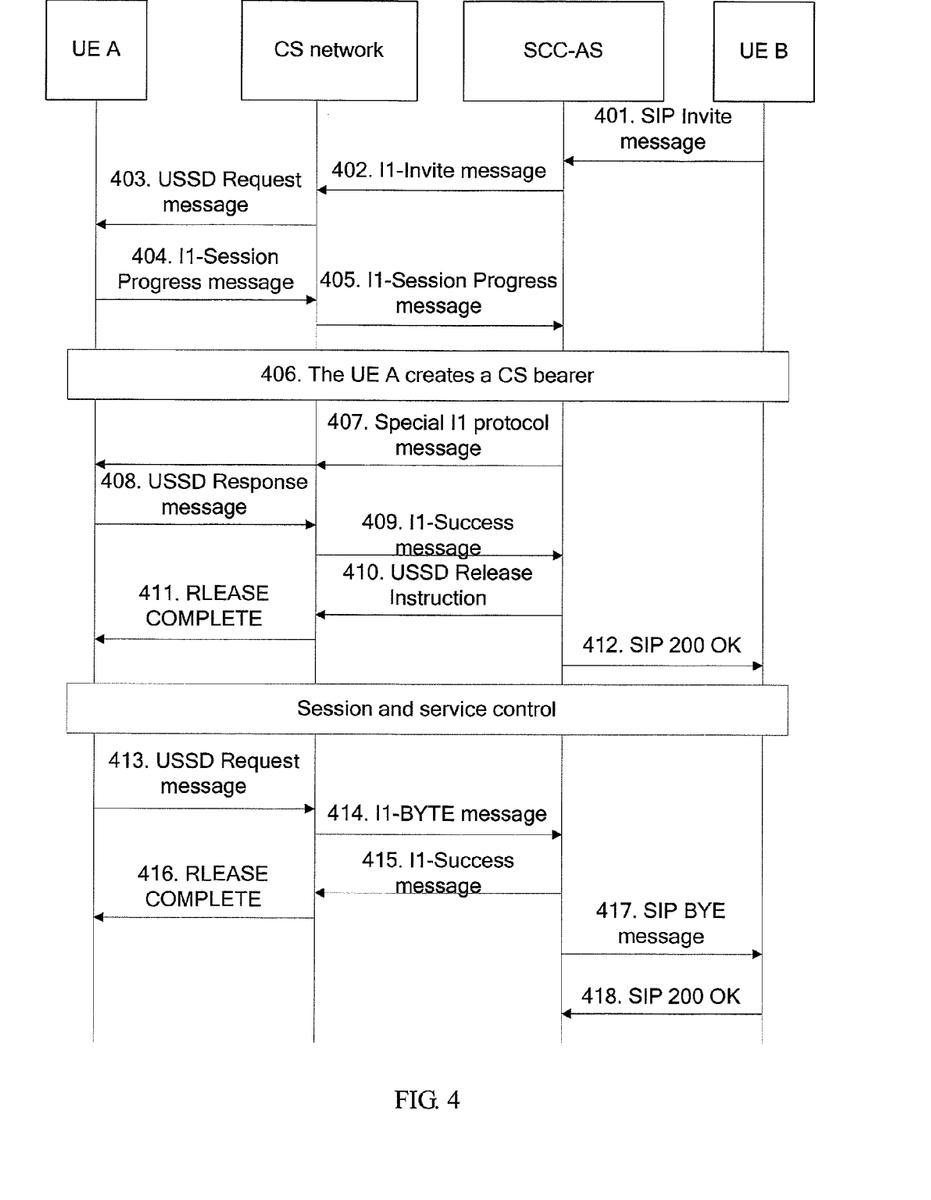
FIG. 4 is a flowchart of a session processing method according to Embodiment 3 of the present invention.

As shown in FIG. 4, a session processing method provided by Embodiment 3 of the present invention may include the following steps:

Step 401: The UE B sends a SIP Invite message to an SCC-AS.

In an application scenario, the UE B proactively initiates an IMS session to the UE A, and the UE B sends a SIP Invite message to the SCC-AS, where the SIP Invite message carries an ID of the UE A (an IMS domain ID), a UE B ID (an IMS domain ID), and so on.

Step 402: The SCC-AS triggers the setup of a USSD transaction.

In an application scenario, after the SCC-AS receives a SIP Invite message sent by the UE B, the SCC-AS triggers a CS network to set up a USSD transaction.

The SCC-AS may find the CS domain ID of the UE A according to the IMS domain ID of the UE A carried by the SIP Invite message, so as to send a message to the UE A by using the CS domain ID of the UE A.

Specifically, the SCC-AS may send a message that carries an I1-Invite message and an ID of UE A (a CS domain ID) to the CS network to trigger the setup of a USSD transaction between the CS network and the UE A. The foregoing I1-Invite message may carry a PSI DN.

Step 403: The CS network sends a USSD Request message to the UE A.

In an application scenario, the CS network addresses the UE according to the UE ID (the CS domain ID) carried by the message sent by the SCC-AS, and sends a USSD Request message to the UE A according to an addressing result to trigger the setup of a USSD transaction between the CS network and the UE A, where the USSD Request message includes a service code and the foregoing I1-Invite message.

Step 404: The UE A sends an I1-Session Progress message to the CS network.

In an application scenario, the UE A may be triggered by the CS network to set up a USSD transaction between the UE A and the CS network, and obtain the PSI DN carried by the I1-Invite message.

The UE A processes the I1-Invite message, and sends an I1-Session Progress message to the CS network through a USSD Response message.

Step 405: The CS network sends an I1-Session Progress message to the SCC-AS.

The CS network further forwards the I1-Session Progress message to the SCC-AS to inform the SCC-AS of the fact that the USSD transaction between the UE A and the CS network is already set up.

Step 406: The UE A creates a CS Bearer to bear IMS media streams.

In an application scenario, the UE A may trigger the setup of a CS bearer by using the obtained PSI DN so as to bear the media streams of the IMS session between the UE A and the UE B.

Specifically, the UE A sends a Setup message that carries the PSI DN to the CS network, requesting the setup of a CS bearer; the CS network further sends a SIP Invite message that carries the PSI DN to the SCC-AS; the SCC-AS further sends a SIP 180 ringing response message to the UE B; the UE B sends a SIP 200 OK message to the SCC-AS; the SCC-AS forwards the SIP 200 OK message to the CS network; the CS network further sends a CONNECT message to the UE A; after the UE A receives the CONNECT message, it knows that the CS bearer setup succeeds and the CS bearer can be used to bear the media streams of the IMS session between the UE A and the UE B. According to the foregoing mode, it is evident that the UE A initiates a CS call by using the PSI DN as the called number to set up a CS bearer.

Step 407: The SCC-AS transfers the turn of data transmission to the UE A.

The transmission and reception of information in the USSD transaction need to be performed on an interactive basis (that is, the CS network or the UE can send a message to the peer end only after receiving a message sent by the peer end). Therefore, if the SCC-AS has no actual I1 protocol message that needs to be sent within a set period of time, the SCC-AS may transfer the turn of data transmission to the UE A, so that the UE A sends data to the SCC-AS.

In actual applications, a timer may be set. When the SCC-AS has no actual data that needs to be sent within a duration set by the timer, the SCC-AS transfers the turn of data transmission to the UE A. The duration of transferring the turn of data transmission may be set according to an actual need, for example, it may be set to 0.5 second.

Specifically, the SCC-AS sends a special I1 protocol message (for example, a defined I1-Dummy message) to the CS network through another USSD Request. In this way, the turn of data transmission is transferred to the UE A.

By using the mechanism for transferring the turn of data transmission, a device that needs to send data can obtain the turn of data transmission immediately. In this way, a message can be transmitted between the UE A and the SCC-AS immediately and effectively, and the flexibility of service control is improved.

Step 408: The UE A sends a USSD Response message to the CS network.

In an application scenario, the UE A sends a USSD Response message that includes an I1-Success message to the CS network to instruct the UE A to pick up and answer the phone and give an answer.

Step 409: The CS network forwards the I1-Success message to the SCC-AS.

Step 410: The SCC-AS triggers the release of the USSD transaction.

In an application scenario, the SCC-AS may initiate the release of the USSD transaction at any time after the IMS session between the UE A and the UE B is set up.

Specifically, the SCC-AS sends an instruction for releasing the USSD transaction to the CS network, instructing the CS network to release the USSD transaction between the CS network and the UE A.

It is understandable that the UE A may trigger the release of the USSD transaction at any time after the IMS session between the UE A and the UE B is set up.

Step 411: The CS network sends a RLEASE COMPLETE message to the UE A.

In an application scenario, the CS network may be triggered to release the USSD transaction between the CS network and the UE A after receiving the instruction for releasing the USSD transaction that is sent by the SCC-AS.

The CS network may further send a RLEASE COMPLETE message to the UE A to inform the UE A of the fact that the USSD transaction is released.

After receiving the RLEASE COMPLETE message, the UE A knows that the USSD transaction that is previously set up between the UE A and the CS network is released.

It is understandable that releasing the USSD transaction between the CS network and the UE A immediately can minimize network resource consumption and increase resource utilization.

Step 412: The SCC-AS sends a SIP 200 OK message to the UE B.

So far, the process of setting up an IMS session by using the USSD transaction ends, and the USSD transaction is released.

It should be noted that multiple I1 protocol messages may be exchanged during the setup of the IMS session. This embodiment is based on the assumption that three I1 protocol messages are exchanged.

After the IMS session is set up, the UE A and the UE B perform normal call services. If service control is required in the call process, the UE A or the SCC-AS may create a new USSD transaction to bear related I1 protocol messages.

Step 413: The UE A triggers the setup of a USSD transaction.

In an application scenario, if the USSD transaction between the UE A and the CS network is already released, when the UE A decides to release a current IMS session (for example, the user of the UE A already hangs up), the UE A may initiate a USSD Request operation again to the CS network to trigger the setup of a USSD transaction between the UE A and the CS network again, so as to bear and send control signaling related to the release of the IMS session.

Specifically, the UE A sends a USSD Request message to the CS network to trigger the setup of a USSD transaction between the UE A and the CS network again, where the USSD Request message may carry an I1-BYE message and a service code.

Certainly, the UE B may also initiate the release of the IMS session. The way of initiating the release of the IMS session by the UE B is similar to the UE A, and is not further described.

Step 414: The CS network sends the I1-BYE message to the SCC-AS.

In an application scenario, the CS network may be triggered by the UE A to re-set up a USSD transaction between the CS network and the UE A.

Further, the CS network addresses a USSD application according to the service code, sends the I1-BYE message to the SCC-AS according to am addressing result, and informs the SCC-AS of the fact that the USSD transaction between the CS network and the UE A is already set up.

Step 415: The SCC-AS triggers the release of the USSD transaction again.

In an application scenario, the SCC-AS receives the I1-BYE message sent by the CS network, and knows that the USSD transaction between the UE A and the CS network is already set up.

The SCC-AS processes the I1-BYE message. It may initiate the release of the USSD transaction again, and send an I1-Success message (to inform the UE A of the fact that the session is released) and an instruction for releasing the USSD transaction to the CS network, instructing the CS network to release the USSD transaction.

Step 416: The CS network sends a RLEASE COMPLETE message to the UE A.

In an application scenario, the CS network may release the USSD transaction between the CS network and the UE A after receiving the instruction for releasing the USSD transaction that is sent by the SCC-AS.

The CS network may further send a RLEASE COMPLETE message to the UE A, informing the UE A of the fact that the USSD transaction is released, where the RELEASE COMPLETE message may include an I1-Success message.

After receiving the RLEASE COMPLETE message, the UE A knows that the USSD transaction that is previously set up between the UE A and the CS network is released. So far, the process of releasing an IMS session between the UE A and the UE B by using the USSD transaction ends, and the USSD transaction is released.

Step 417: The SCC-AS sends a SIP BYE message to the UE B.

In an application scenario, the SCC-AS may further send a SIP BYE message to the UE B to instruct the UE B to release the IMS session.

It is understandable that step 417 may be executed before step 416 or that step 416 and step 417 may be executed at the same time.

Step 418: The UE B sends a SIP 200 OK message to the SCC-AS.

In an application scenario, after the UE B receives a SIP BYE message, the UE B releases the IMS session between the UE B and the UE A, and sends a SIP 200 OK message to the SCC-AS to indicate that the IMS session is already released.

It can be seen from the foregoing technical solution that, in this embodiment, when the UE B initiates an IMS call to the UE A, it triggers the setup of a USSD transaction between the CS network and the UE A. By using the USSD transaction, I1 protocol messages exchanged between the UE A and the SCC-AS can be sent reliably, which facilitates the reliable control over IMS session services between the UE A and the UE B.

Further, the UE A and the SCC-AS manage the USSD transaction flexibly, which improves the flexibility of the entire solution and is good for reducing network resource consumption.

The foregoing Embodiment 2 and Embodiment 3 are based on the assumption that the UE A is an ICS UE and the UE B is an IMS UE. Certainly, if the UE B is also an ICS UE, the UE B can interact with the CS network and the SCC-AS in the same way as with the UE A, and the UE B and the UE A can still implement IMS services through the SCC-AS. In addition, the UE B may also be a current CS UE and is connected to the IMS domain through a gateway.

For better implementation of the technical solutions provided by the foregoing embodiments of the present invention, an embodiment of the present invention also provides an AS.

Embodiment 4

Figure 5:
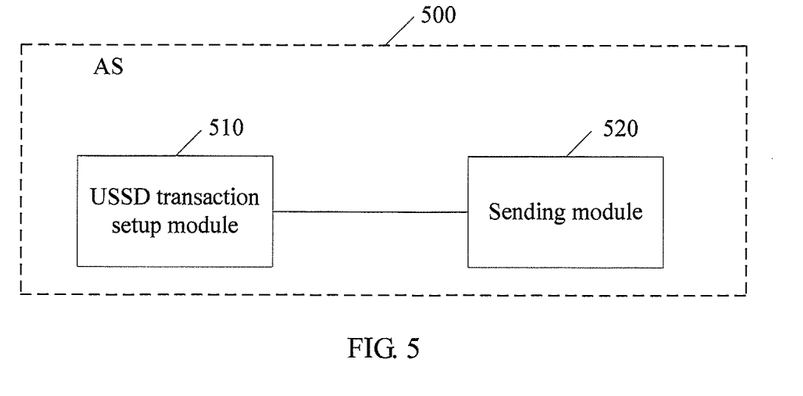
FIG. 5 is a schematic diagram of an AS according to Embodiment 4 of the present invention.

As shown in FIG. 7, Embodiment 4 of the present invention provides an AS 500. The AS 500 may include a USSD transaction setup module 510 and a sending module 520.

The USSD transaction setup module 510 is configured to trigger the setup of a USSD transaction between a CS network and a first UE when a second UE initiates an IMS session to the first UE, where the first UE is an ICS UE.

The sending module 520 is configured to send, by using the USSD transaction, an I1 protocol message used to bear IMS session control signaling to the first UE.

In an application scenario, when the AS 500 is to send an I1 protocol message or another message to the first UE, if it is found that a USSD transaction is currently not set up between the CS network and the first UE, the USSD transaction setup module 510 may trigger the setup of a USSD transaction between the CS network and the first UE.

For example, when the AS 500 receives a SIP protocol message that the second UE uses to initiate an IMS session to the first UE, if it is found that a USSD transaction is currently not set up between the CS network and the first UE, the USSD transaction setup module 510 may send a message to the CS network, instructing the CS network to set up a USSD transaction between the CS network and the first UE, so as to bear an I1 protocol message used to initiate an IMS session.

The sending module 520 may bear and send each I1 protocol message by using the USSD transaction between the CS network and the first UE to perform the I1 protocol interaction and implement reliable control over IMS services.

In an application scenario, the AS 500 may further include:
a release triggering module, configured to trigger the release of the USSD transaction between the CS network and the first UE when the session between the first UE and the second UE is set up or released.

In an application scenario, the first UE may send an I1-Invite message and the CS domain ID of the first UE to the CS network through the foregoing USSD transaction, where the I1-Invte message carries the IMS domain ID of the first UE; the CS network forwards the I1-Invite message and the CS domain ID of the first UE to the AS 500.

The AS 500 may further include:
an authenticating module, configured to: after receiving an I1-Invite message and the CS domain ID of the first UE, find an IMS domain ID of the first UE by using the CS domain ID of the first UE, and authenticate the IMS domain ID of the first UE carried by the I1-Invite message by using the found IMS domain ID of the first UE.

If the found one or multiple IMS domain IDs of the first UE include the IMS domain ID of the first UE carried by the I1-Invite message, the authentication performed by the authenticating module succeeds; otherwise, the authentication performed by the authenticating module fails.

In an application scenario, the AS 500 may further include:
an ID converting module, configured to: after receiving a SIP Invite message sent by the second UE, find the CS domain ID of the first UE by using the IMS domain ID of the first UE carried by the SIP Invite message so as to address the first UE according to the found CS domain ID of the first UE.

The AS 500 may send the I1-Invite message and the found CS domain ID of the first UE to the CS network, and trigger the setup of a USSD transaction between the CS network and the first UE.

The CS network sends a USSD Request message that carries the I1-Invite message to the first UE according to the CS domain ID of the first UE found by the AS 500, and triggers the setup of a USSD transaction between the CS network and the first UE.

In an application scenario, the sending module 520 may send an I1 protocol message used to transfer the turn of data transmission to the first UE by using the USSD transaction, and transfer the turn of data transmission to the first UE.

It is understandable that the AS 500 provided by this embodiment may be the SCC-AS provided by the foregoing method embodiments. The functions of each functional modules of the AS 500 may be implemented according to the method provided by the foregoing method embodiments. For the specific implementation process, refer to the relevant descriptions in the foregoing embodiments, and therefore the process is not further described.

For better implementation of the technical solutions provided by the foregoing embodiments of the present invention, an embodiment of the present invention also provides a UE.

Embodiment 5

Figure 6:
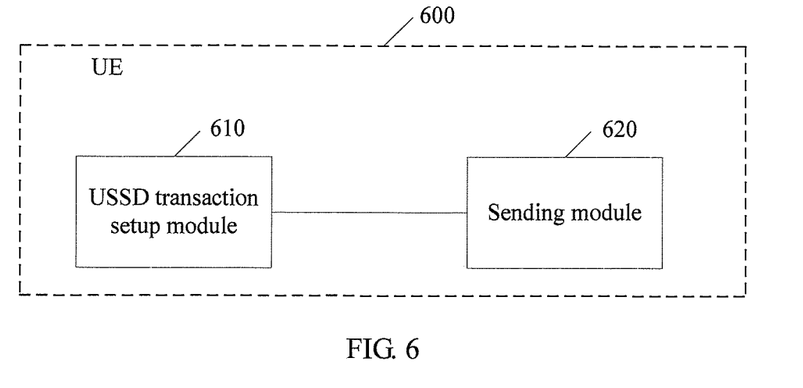
FIG. 6 is a schematic diagram of a UE according to Embodiment 5 of the present invention.

As shown in FIG. 6, Embodiment 5 of the present invention provides a UE 600. The UE 600 may include a USSD transaction setup module 610 and a sending module 620.

The USSD transaction setup module 610 is configured to trigger the setup of a USSD transaction between a CS network and a first UE when initiating an IMS session to a second UE. The UE 600 may be the first UE.

The sending module 620 is configured to send an I1 protocol message used to bear IMS session control signaling to the SCC-AS by using the USSD transaction.

In an application scenario, when the UE 600 is to send an I1 protocol message or another message to the SCC-AS, if it is found that a USSD transaction is currently not set up between the CS network and the first UE, the USSD transaction setup module 610 may trigger the setup of a USSD transaction between the CS network and the first UE.

For example, when the UE 600 is to initiate an IMS session to the second UE, if it is found that a USSD transaction is currently not set up between the CS network and the first UE, the USSD transaction setup module 610 may send an USDD Request message to the CS network, requesting to set up a USSD transaction between the CS network and the first UE, so as to bear an I1 protocol message that the first UE uses to initiate an IMS session.

In an application scenario, the UE 600 may further include:
a release triggering module, configured to trigger the release of the USSD transaction between the CS network and the first UE when the session between the first UE and the second UE is set up or released.

In an application scenario, the sending module 620 may send an I1 protocol message used to transfer the turn of data transmission to the first UE by using the USSD transaction, and transfer the turn of data transmission to the SCC-AS.

It is understandable that the UE 600 provided by this embodiment may be the UE A provided by the foregoing method embodiments. The functions of each functional modules of the UE 600 may be implemented according to the method provided by the foregoing method embodiments. For the specific implementation process, refer to the relevant descriptions in the foregoing embodiments, and therefore the process is not further described.

For better implementation of the technical solutions provided by the foregoing embodiments of the present invention, an embodiment of the present invention also provides a communication system.

Embodiment 6

Figure 7:
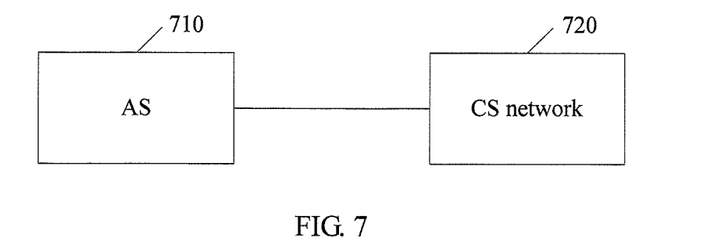
FIG. 7 is a schematic diagram of a communication system according to Embodiment 6 of the present invention.

As shown in FIG. 7, Embodiment 6 of the present invention provides a communication system. The communication system may include an AS 710, and a CS network 720.

The AS 710 is configured to: trigger the setup of a USSD transaction between the CS network and a first UE when a second UE initiates an IMS session to the first UE, and send, by using the USSD transaction, an I1 protocol message used to bear IMS session control signaling to the first UE.

The CS network 720 is configured to: when triggered by the AS 710, set up a USSD transaction with the first UE, and forward, by using the USSD transaction, the I1 protocol message sent by the AS 710 and used to bear IMS session control signaling to the first UE, and/or receive an I1 protocol message sent by the first UE and used to bear IMS session control signaling.

Further, the CS network 720 may also be triggered by the first UE to set up a USSD transaction between the CS network 720 and the first UE.

Further, the CS network 720 may also be triggered by the first UE or the AS 710 to set up a USSD transaction between the CS network 720 and the first UE.

It is understandable that the AS 700 provided by this embodiment may be the AS 500 provided by Embodiment 4 and that the CS network 720 may be the CS network provided by the foregoing method embodiments. The functions of the AS 700 and the CS network 720 may be implemented by using the methods provided by the foregoing method embodiments. For the specific implementation process, refer to the relevant descriptions in the foregoing embodiments, and therefore the process is not further described.

It should be noted that, for ease of description in the foregoing method embodiments, the method is described as a combination of a series of actions. Those skilled in the art should know that the present invention is not limited by the sequence of the actions. Some steps may be executed in other sequence or at the same time according to the present invention. In addition, those skilled in the art should know that the embodiments in the specification are exemplary embodiments and that actions and modules involved in these embodiments are not mandatory for the present invention.

In the foregoing embodiments, each embodiment has its emphasis. What is not detailed in one embodiment of the present invention is detailed in the related description of another embodiment.

In conclusion, according to the embodiments of the present invention, when a UE is to set up an IMS session, a USSD transaction is set up between the UE and the CS network; an I1 protocol message exchanged between the UE and the SCC-AS is sent effectively and reliably by using the USSD transaction, which facilitates reliable control over IMS services.

Further, the UE A and the SCC-AS manage the USSD transaction flexibly, which improves the flexibility of the entire solution and is good for reducing network resource consumption.

It is understandable to persons skilled in the art that all or some of the steps in the foregoing embodiments may be implemented by related hardware instructed by a program. The program may be stored in a computer readable storage medium. When the program is executed, the processes of the preceding methods are executed. The storage medium may be a magnetic disk, a Compact Disk Read-Only Memory (CD-ROM), a Read-Only Memory (ROM) or a Random Access Memory (RAM).

Detailed above are a session processing method, device, and communication system according to the embodiments of the present invention. Although the principle and implementation of the present invention are described with reference to exemplary embodiments, the embodiments are only intended to help understand the method and core idea of the present invention. In addition, with respect to the implementation and applicability of the present invention, modifications and variations may be made by persons skilled in the art according to the idea of the present invention. Therefore, the specification shall not be construed as a limitation on the present invention.

What is claimed is:

1. A session processing method, comprising:
  when a first User Equipment (UE) is to set up an IP Multimedia Subsystem (IMS) session with a second UE, triggering setup of an unstructured supplementary service data (USSD) transaction between a Circuit Switched (CS) network and the first UE; and
  sending, by using the USSD transaction, an I1 protocol (IMS Centralized Services (ICS) protocol) message used to bear IMS session control signaling;
  wherein the sending, by using the USSD transaction, an I1 protocol message used to bear IMS session control signaling further comprises:
  sending, by the first UE, a specific I1 protocol message to a SCC-AS (Service Centralization and Continuity (SCC) Application Server (AS)) by using the USSD transaction to transfer a turn of data transmission to the SCC-AS; or
  sending, by the SCC-AS, a specific I1 protocol message to the first UE by using the USSD transaction to transfer a turn of data transmission to the first UE.

2. The method according to claim 1, wherein the triggering setup of a USSD transaction between a CS network and the first UE when the first UE is to set up an IMS session with a second UE comprises:
  when the first UE initiates an IMS session to the second UE, triggering, by the first UE, setup of the USSD transaction between the CS network and the first UE; or
  when the second UE initiates an IMS session to the first UE, triggering, by the SCC-AS, setup of the USSD transaction between the CS network and the first UE.

3. The method according to claim 2, further comprising:
  after an IMS session between the first UE and the second UE is set up or released, triggering, by the first UE or the SCC-AS, release of the USSD transaction.

4. The method according to claim 3, further comprising:
  when the first UE is to release the IMS session, triggering, by the first UE, setup of the USSD transaction between the CS network and the first UE; or
  when the second UE is to release the IMS session, triggering, by the SCC-AS, setup of the USSD transaction between the CS network and the first UE.

5. The method according to claim 1, wherein the sending, by using the USSD transaction, an I1 protocol message used to bear IMS session control signaling comprises:
  sending, by the first UE, an I1-Invite message and a CS domain ID of the first UE to the SCC-AS by using the USSD transaction, wherein the I1-Invite message carries an IMS domain ID of the first UE;
  the method further comprises:
  authenticating, by the SCC-AS, the IMS domain ID of the first UE carried by the I1-Invite message by using the CS domain ID of the first UE.

6. The method according to claim 2, wherein before the SCC-AS triggers the setup of the USSD transaction between the CS network and the first UE, the method further comprises:
  receiving, by the SCC-AS, a Session Initiation Protocol (SIP) Invite message sent by the second UE, wherein the SIP Invite message carries an IMS domain ID of the first UE; and finding, by the SCC-AS, a CS domain ID of the first UE by using the IMS domain ID of the first UE carried by the SIP Invite message so as to address the first UE according to the found CS domain ID of the first UE.

7. An Application Server (AS), comprising:
  an unstructured supplementary service data (USSD) transaction setup module, configured to trigger setup of a USSD transaction between a Circuit Switched (CS) network and a first User Equipment (UE) when a second UE initiates an IP Multimedia Subsystem (IMS) session to the first UE; and
  a sending module, configured to send, by using the USSD transaction, an I1 protocol (IMS Centralized Services (ICS) protocol) message used to bear IMS session control signaling to the first UE;
  wherein, the sending module is configured to send a specific I1 protocol message to the first UE by using the USSD transaction to transfer a turn of data transmission to the first UE.

8. The AS according to claim 7, further comprising:
a release triggering module, configured to trigger release of the USSD transaction when the IMS session between the first UE and the second UE is set up or released.

9. The AS according to claim 7, further comprising:
an authenticating module, configured to: after receiving an I1-Invite message and a CS domain ID of the first UE, find an IMS domain ID of the first UE by using the CS domain ID of the first UE, and authenticate, by using the found IMS domain ID of the first UE, the IMS domain ID of the first UE carried by the I1-Invite message.

10. The AS according to claim 7, further comprising:
an ID converting module, configured to: after receiving a Session Initiation Protocol (SIP) Invite message sent by the second UE, find a CS domain ID of the first UE by using the IMS domain ID of the first UE carried by the SIP Invite message so as to address the first UE according to the found CS domain ID of the first UE.

11. A User Equipment (UE), comprising:
a USSD transaction setup module, configured to trigger setup of an unstructured supplementary service data (USSD) transaction between a Circuit Switched (CS) network and a first User Equipment (UE) when initiating an IP Multimedia Subsystem (IMS) session to a second UE; and
a sending module, configured to send, by using the USSD transaction, an I1 protocol (IMS Centralized Services (ICS) protocol) message used to bear IMS session control signaling to a Service Centralization and Continuity (SCC) Application Server (AS) (SCC-AS);
wherein, the sending module is configured to send a specific I1 protocol message to the SCC-AS by using the USSD transaction to transfer a turn of data transmission to the SCC-AS.

* * * * *